(No Model.)
C. W. TERPENING.
HAND PLOW.
No. 325,775. Patented Sept. 8, 1885.
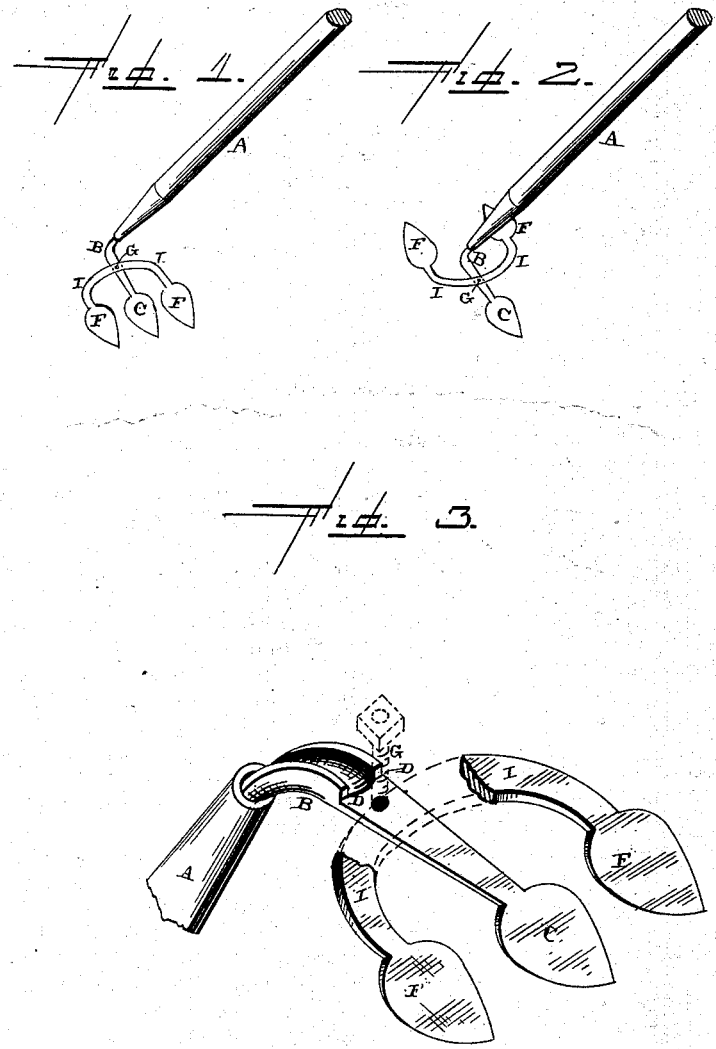

UNITED STATES PATENT OFFICE.

CLINTON W. TERPENING, OF BEDFORD, IOWA.

HAND-PLOW.

SPECIFICATION forming part of Letters Patent No. 325,775, dated September 8, 1885.

Application filed June 30, 1885. (No model.)

*To all whom it may concern:*

Be it known that I, CLINTON W. TERPENING, of Bedford, in the county of Taylor and State of Iowa, have invented certain new and useful Improvements in Hand-Plows; and I do hereby declare the following to be a full, clear, and exact description of the invention, such as will enable others skilled in the art to which it pertains to make and use it, reference being had to the accompanying drawings, which form part of this specification.

My invention relates to an improvement in hand-plows; and it consists in the combination of a beam in the shape of a handle, and having one or more shovels attached to its shank, with two or more shovels which can be reversed upon the shank of the handle for the purpose of having all of the shovels placed in a row, or having a portion extending in one direction and a portion in the other, as will be more fully described hereinafter.

The object of my invention is to provide a hand-plow which can be readily operated by a person, and in which one or more of the shovels can be brought into play, as may be desired, at the same time.

Figure 1 represents a perspective showing the shovels all turned in the same direction. Fig. 2 is a similar view showing a portion of the shovels reversed. Fig. 3 shows a perspective of the two parts of the plow slightly separated from each other.

A represents the beam, which is made in the form of a handle, and which has the bent shank B secured to its inner end. To this shank, below the bend, is secured or attached a shovel, C, of any suitable form or make that may be preferred. In the rear side of this shank, at any suitable distance from its bend, is formed a recess or shoulder, D, for the purpose of catching over the central part of the two shovels F, which are to be secured to this shank by means of a bolt, G. The shovels F are secured to the ends of the bent perforated rod or frame I, which bar is so shaped as to bring the shovels F in any desired relation to the one C. All of the shovels can be arranged in a line with each other, as shown in Fig. 1; but when it is desired to have only two of the shovels upon one side the bolt G is removed, and the two shovels F are detached from the shank and then reversed in position, and again secured in place. When the shovels F are reversed, they project in one direction and the shovel C in the other, thus forming a double implement.

In using this plow the operator takes hold of the handle or beam and draws it along through the ground, exerting an amount of pressure upon the beam according to the depth it is desired to force the shovels into the earth.

This plow is intended especially for loosening ground and removing weeds, and will enable one man to do as much in a given time as four men can do with hoes.

In whatever position the shovels are turned they are held rigidly in place by the bend or groove in the shank by fitting against the edges of the part I.

Having thus described my invention, I claim—

1. The combination of the beam or handle, a bent shank, and the shovel C with the bent rod or frame, the shovels F, and the bolt for securing the parts together, substantially as shown.

2. The combination of the beam or handle, the grooved or recessed shank having a shovel attached thereto, the bent frame having a shovel attached to each end, and a clamping-bolt, the shovels being reversible in relation to each other, substantially as set forth.

3. The combination of the beam, which is shaped like a handle, with a number of shovels, which are attached thereto, and which shovels are reversible in relation to each other, substantially as described.

In testimony whereof I affix my signature in presence of two witnesses.

CLINTON W. TERPENING.

Witnesses:
ALEX. JOHN,
CHAS. MORRIS.